Dec. 6, 1938.  W. B. BARNES  2,139,350
OVERDRIVE GEARING
Filed March 28, 1934
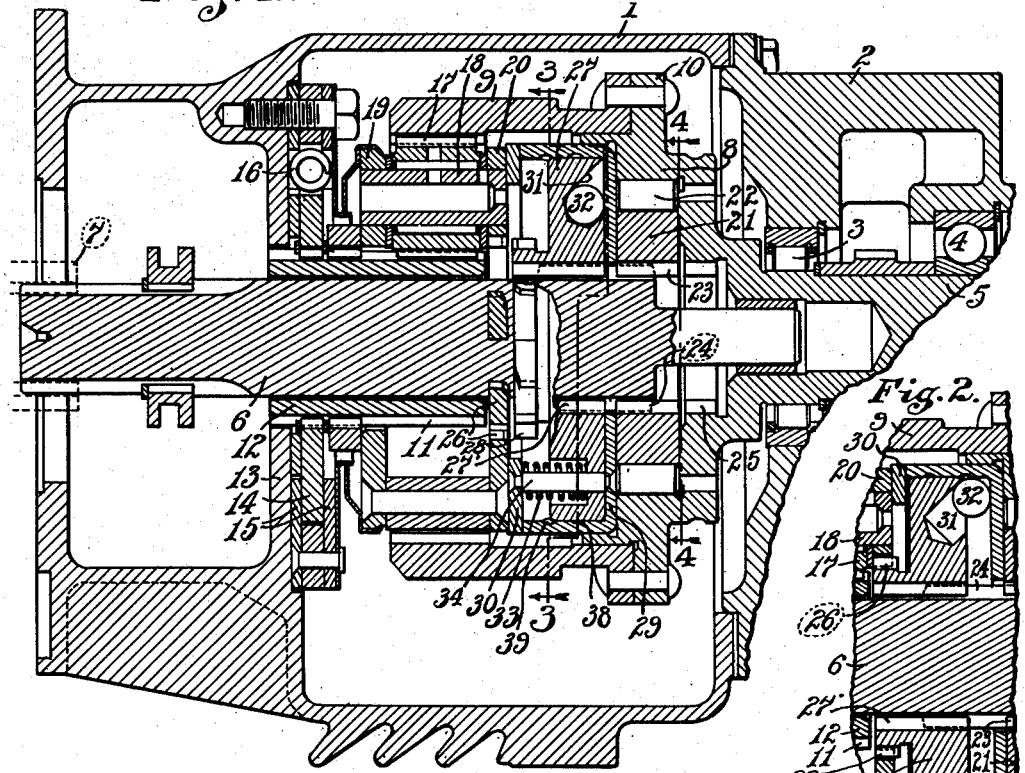
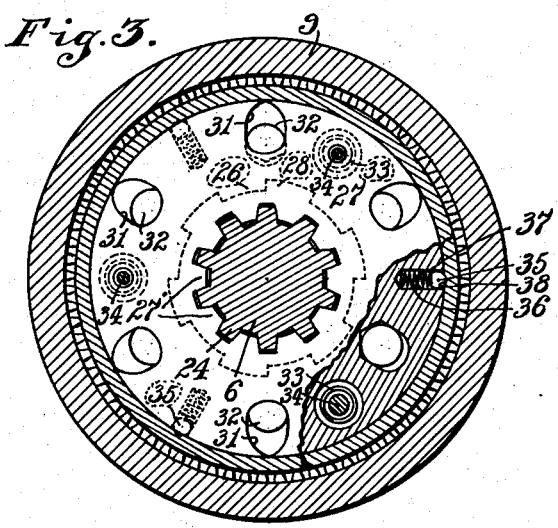
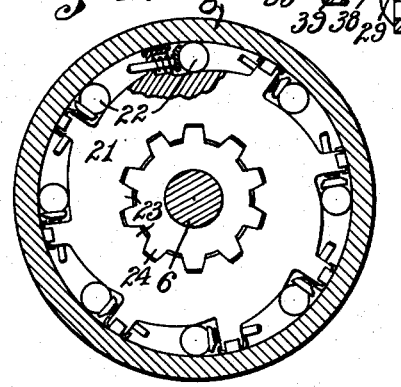
INVENTOR.
William B. Barnes,
BY
Hood + Hahn
ATTORNEYS Patented Dec. 6, 1938

2,139,350

UNITED STATES PATENT OFFICE 2,139,350

OVERDRIVE GEARING

William B. Barnes, Indianapolis, Ind.

Application March 28, 1934, Serial No. 717,731

7 Claims. (Cl. 74—260)

My invention relates to improvements in transmissions and particularly to a type of transmission for establishing an overdrive between the driving and driven shafts whereby when desirable the driven shaft may be operated at a higher speed than that of the driving shaft.

One of the objects of my invention is to provide means whereby this overdrive may be automatically established by the control of the speed of the shaft.

Another object of my invention is to provide an overdrive wherein the parts may be set for operation but will not be actually operated until after the speed of the propeller shaft has reached a predetermined point and then by a simple control of the speed of the driving and driven shafts, the overdrive will automatically be established.

Another object of my invention is to provide automatic clutching means adapted, when the speed of the driven shaft reaches a predetermined point, to be moved into a position to engage but which will not engage, for the purpose of establishing the overdrive, until the speed of the driving and driven shafts has reached approximate synchronism.

Further objects of my invention will appear more fully hereafter in the appended specification and claims.

For the purpose of disclosing my invention I have illustrated certain embodiments thereof in the accompanying drawing, in which Fig. 1 is a longitudinal sectional view of a transmission embodying one form of my invention;

Fig. 2 is a detail sectional view showing the parts, of the automatic clutch, in their engaged position;

Fig. 3 is a transverse sectional view taken on the line 3—3 of Fig. 1;

Fig. 4 is a transverse sectional view taken on the line 4—4 of Fig. 1, and

Fig. 5 is a diagrammatically developed view of the clutch members.

In the embodiment of the invention illustrated I provide a casing 1 having a rear closure head 2 in which is supported by suitable roller and ball bearings 3 and 4 the propeller shaft 5. This propeller shaft has piloted therein an axially shiftable shaft 6 which in turn has a splined connection with the driving shaft 7. The propeller shaft 5 has mounted thereon an overhanging member comprising one member 8 of an overrunning clutch and an outer or ring gear 9 of a planetary gearing. This ring gear preferably is formed on a separate part, being bolted or otherwise secured to a flange 10 connected to the propeller shaft.

A sun gear 11, of the planetary gearing is mounted on a sleeve 12 which surrounds the shaft 6 and is connected to the wall 13 of the casing by a suitable disc 14 having internal teeth engaging splines on the sun gear which disc is resiliently connected to stop discs 15 bolted or otherwise secured to the wall 13, through the instrumentality of springs 16, interposed between the two sets of discs.

Meshing with the sun and ring gears is a plurality of planetary pinions 17 mounted on spindles 18, preferably hollow, which are carried in a pinion carrier preferably comprising two side members 19 and 20.

The inner member 21 of the overrunning clutch surrounds the shaft 6, there being interposed between the inner and outer members of this clutch suitable clutch rollers 22 and this inner member is provided with internal teeth 23 adapted to be meshed with teeth 24 on the axially shiftable shaft 6. The teeth 24 also are adapted to engage or mesh with internal teeth 25 on the driven shaft 5.

For the purpose of connecting the driving and driven shafts through the instrumentality of the planetary gear above described, I provide an automatic centrifugally operated clutch. One member of this clutch is connected to the side member 20 of the pinion carrier and includes a set of teeth 26. The other member 27 of this clutch includes a set of teeth 28 and is adapted to be connected with the axially shiftable shaft 6 through the instrumentality of teeth 27' adapted to be meshed with the teeth 24 on the shaft 6. This clutch member is axially shiftable in a suitable cage or casing, one side wall 29 of which bears against the faces of the outer and inner members of the overruning clutch and the other side wall 30 of which bears against the side of the side member 20 on the pinion carrier so that this cage is prevented from having any axial movement. The shiftable member 27 is provided with a plurality, preferably six in number, of diagonally disposed channels or openings 31 in which are disposed centrifugal weights in the form of balls 32 normally resting at the bottom of these channels or openings. It will be noted that the open side of these channels takes against the side member 29 of the casing or cage. This centrifugally operated member of the clutch is biased into normal or retracted position under the influence of a plurality of coiled spring 33 surrounding pins 34 connected to the respective sides 29 and 30 of the cage, one end of these springs bearing against the side member 30 and the opposite end against the clutch member 27.

In addition to the retracting springs 33 I provide a plurality of holding detents 35 arranged in radially disposed openings 36 in the clutch member 27 and biased outwardly by suitable coil springs 37. These detents take into, in one position, recesses 38 in the cage, and in another position, recesses 39.

The clutch teeth 26 and 28 are of peculiar construction and are such that the two sets of teeth must be operating in substantial synchronism before they will engage. The faces of these teeth are slightly inclined as at 40 and then at their edges take a sharper angle 41 so that, as will be apparent from Fig. 5, when the teeth are moved towards one another by the axial movement of the clutch member 27, there will be a tendency for the two sets of teeth to cam over one another until they have approached practically synchronism at which time the teeth will slip into interdigitated engagement.

In operation, when it is desired to drive the driven shaft directly, that is at the same speed as the driving shaft 7 or the same speed as the axially shiftable shaft 6, which for certain purposes may be considered the driving shaft, the shaft 6 is shifted to the right, looking at Fig. 1, until the teeth 24 thereof are in engagement with the teeth 25. Under these circumstances a direct drive is established, and under these circumstances the teeth 25 will be out of engagement with the internal teeth on the axially shiftable clutch member 27. If, now, it is desired to shift the parts into a position whereby the overspeed drive may be established, the axially shiftable shaft 6 is shifted to the left until the teeth 24 are disengaged from the teeth 25 and a portion of these teeth 24 engage with the teeth 27' and also with the teeth 23 of the inner member of the overrunning clutch. As long as the speed of the parts are below the predetermined, or critical speed, a direct drive will still be established between the shafts 7 and 5 although that drive will be a one-way drive through the instrumentality of the overrunning clutch.

We will assume that when the speed of the vehicle reaches a speed of forty miles an hour it is desirable to throw in the overspeed drive and at this speed to drive the propeller shaft through the overspeed drive. Under these circumstances we will assume that at forty miles per hour the propeller shaft is rotating at 2000 R. P. M. It will be noted that under these circumstances the ring gear is being driven from the propeller shaft and therefore the pinion carrier 20 is likewise being driven but due to the gearing the speed of this pinion carrier is much less, say approximately 1400 R. P. M. The load of the coiled springs 33 and the load imposed by the detents 35 in engagement with the notches 38 is such that this combined load will prevent movement of the clutch member 27 at less than 2000 R. P. M., which it will be noted is the speed not only of the propeller shaft but also of the shaft 6 as well as that of the driving shaft 7. When the speed of these shafts exceeds 2000 R. P. M. the centrifugal force, exerted by the balls 32 climbing in their slots 31 and acting against the face of the side wall 29, will overcome the combined load of the detents and spring and force the clutch member 27 to the left, looking at Fig. 1, thereby moving the clutch teeth 28 towards the clutch teeth 26. However the clutch teeth 26 are moving only at the speed of 1400 R. P. M., much less than the speed of the clutch teeth 28 and due to the shape of the teeth, as heretofore explained, there will be no engagement even though there is a constant tendency of the teeth to engage, until the speed of the two sets of teeth have reached approximate synchronism. This engagement will not take place as the cammed surfaces 40 and 41 of one set of teeth ride over the cammed surfaces of the other set of teeth. In order to produce engagement therefore the speed of the shaft 6 and likewise the shaft 7 is permitted to drop until the speed of the teeth 28 approximates the speed of the teeth 26 at which time engagement will take place and after this engagement the drive will be through the planetary overspeed gear drive. It is to be noted that the speed of the shaft, and likewise the clutch member 27, can be dropped to 1400 R. P. M. without the springs 33 tending to retract the clutch member in a non-engaging position. After the clutch teeth have been engaged, or at about the same time this complete engagement takes place, the detents 35 will snap into the notches 39 so that, with this additional holding power, the springs 33 will not tend to retract the clutch member 27 to disengaging position until the speed of the clutch member has dropped well below the critical speed, 1400 R. P. M. This is to insure the disengagement of the clutch and therefore the establishment of the direct drive at a much lower speed than say forty miles per hour. In other words before the overrunning drive is disengaged the speed of the vehicle, driven by the transmission must drop to say thirty miles per hour. However if it is desired that the clutch disengage at approximately forty miles an hour the detent notches 39 may be dispensed with as they are primarily used in order to obtain what may be called a snap action in the disengagement of the members.

As soon of course as the speed of the vehicle is dropped to the predetermined point and the overspeed drive disconnected, a clutch drive will be established between the shafts 7, 6, and 5 through the overrunning clutch and of course if it is desired to lock out the overrunning clutch the axially shiftable shaft 6 may be shifted again to the rear, looking at Fig. 1, to engage the clutch teeth 24 and 25.

It is of course understood that the shifting of the axial shaft may be accomplished by any suitable means, as for instance a shifting fork operated manually or otherwise.

I claim as my invention:

1. In a transmission, the combination with a driving shaft and a driven shaft, of a transmission gearing for driving said driven shaft from said driving shaft at a greater speed than the driving shaft, a clutch for drivingly connecting said members through said gearing engageable only when the two members of the clutch are operating in substantial synchronism and centrifugally operated means responsive to the speed of the driving shaft for moving one of the members of said clutch axially into engaging position.

2. The combination with a driving and a driven shaft, of a transmission gearing for establishing a different speed drive between said driving and driven shafts, a centrifugally-operated toothed clutch for drivingly connecting said shafts through said gearing, the members of said clutch being engageable only when they are moving substantially in synchronism, one of the members of said clutch being drivingly connected with said driven shaft through said gearing, and a centrifugally operated clutch member drivingly connected with and responsive to the speed of said driving shaft independently of said gearing, retracting means for retracting the centrifugally moved member from engaging position when the speed thereof falls below a predetermined point, and restraining means for holding said centrifugally-moved clutch member against movement, the combined effect of said restraining means and said retracting means being such as to restrain the centrifugally operated member of the clutch against movement until the speed thereof has mounted well above the critical point of the retracting means.

3. The combination with a driving and a driven shaft, of means for establishing a direct drive between said shafts, a transmission gearing for establishing a different speed drive between said driving and driven shafts, a centrifugally operated clutch including a pair of toothed engaging members, one of which is centrifugally operated for drivingly connecting said shafts through said gearing, the members of said clutch being engageable only when they are moving substantially in synchronism, one of the members of said clutch being drivingly connected with said driven shaft through said gearing and the centrifugally-operated member of the clutch being connected with and responsive to the speed of said driving shaft independently of said gearing, retracting means for said centrifugally operated clutch member and restraining means for holding said centrifugally operated clutch member from moving into engaging position, the sum of the restraining effort of said retracting and restraining means being sufficient to prevent the movement into engaging position of the centrifugally operated member until the speed of the driven shaft, when driven directly from the driving shaft, has reached a predetermined point, and the retracting effort of the retracting means being such as not to retract the centrifugally operated clutch member against centrifugal bias until the speed thereof falls below a predetermined point lower than said first-mentioned predetermined point.

4. In a transmission, the combination with a driving shaft and a driven shaft, of a transmission gearing for establishing a different speed drive between said driving and driven shafts, a centrifugally operated toothed clutch for drivingly connecting said shafts through said gearing, the members of said clutch being engageable only when they are moving substantially in synchronism, one of the members of said clutch being drivingly connected with said driven shaft through said gearing, and a centrifugally operated clutch member connected to and responsive to the speed of said driving shaft independently of said gearing, retracting means for moving said centrifugally operated member into disengaging position, restraining means for holding said centrifugally operated member in its disengaged position, the sum of the efforts of said retracting and restraining means being such as to prevent the movement of said centrifugally operated member under centrifugal force until the speed thereof reaches a predetermined point, said restraining means at said point releasing the centrifugally operated clutch member to permit the same to move into engaging position, the retracting effort of said retracting means being insufficient to move said centrifugally operated member to its disengaging position until the speed thereof has dropped below a predetermined point lower than said first-mentioned predetermined point.

5. In a transmission, the combination with a driving shaft and a driven shaft, of a transmission gearing for driving said driven shaft from said driving shaft, a toothed clutch for establishing driving relation between the driving and driven shafts through said gearing, one of the members of said clutch being adapted to be driven from said driving shaft and axially movable under centrifugal force into engaging position when the speeds of the shafts reach a predetermined point, and including a plurality of diagonally radially movable members adapted to bear against a relatively axially stationary member for moving the axially movable clutch member into engaging position and the other member of the clutch being relatively axially stationary and connected to one of the members of said gearing.

6. In a transmission, the combination with a driving shaft and a driven shaft, of a transmission gearing for driving said driven shaft from said driving shaft, a toothed clutch for establishing driving relation between the driving and driven shafts through said gears, one of the members of said clutch being axially movable and adapted to be driven from said driving shaft, and having a plurality of recesses therein extending at an angle less than a right angle to the axis of said member, and centrifugally operated weights located in said recesses and movable under the influence of centrifugal force outwardly at an angle to the axis of said member against a stationary abutment to thereby move said clutch member axially and the other member of the clutch being connected to a gearing member and being axially stationary.

7. In a transmission, the combination with a driving shaft and a driven shaft, of a transmission gearing for driving said driven shaft at a different speed than the driving shaft, a toothed clutch for establishing driving relation between said driving and driven shafts, the members of said clutch being engageable only when they are moving substantially in synchronism, one of the members of said clutch being movable axially under the influence of centrifugal force into engaging position when the speed of the shafts reaches a predetermined point and being drivingly connected to and responsive to the speed of the driving shaft.

WILLIAM B. BARNES.